United States Patent
Padmanabhan et al.

(10) Patent No.: US 7,421,570 B2
(45) Date of Patent: Sep. 2, 2008

(54) METHOD FOR MANAGING A MICROPROCESSOR STACK FOR SAVING CONTEXTUAL DATA

(75) Inventors: Gosagan Padmanabhan, Aix en Provence (FR); Dragos Davidescu, Aix en Provence (FR); Franck Roche, Trets (FR)

(73) Assignee: STMicroelectronics, SA, Montrouge (FR)

( * ) Notice: Subject to any disclaimer, the term of this patent is extended or adjusted under 35 U.S.C. 154(b) by 358 days.

(21) Appl. No.: 10/779,855

(22) Filed: Feb. 17, 2004

(65) Prior Publication Data

US 2004/0221141 A1    Nov. 4, 2004

(30) Foreign Application Priority Data

Feb. 17, 2003    (FR)    ................... 03 01879

(51) Int. Cl.
    *G06F 9/48*    (2006.01)
(52) U.S. Cl. ...................................... 712/228
(58) Field of Classification Search ................... 712/228
    See application file for complete search history.

(56) References Cited

U.S. PATENT DOCUMENTS

| 4,445,173 | A  | * | 4/1984 | Pilat et al. ................... 712/228 |
| 6,199,155 | B1 | * | 3/2001 | Kishida et al. ............... 712/210 |
| 6,205,467 | B1 |   | 3/2001 | Lambrecht et al. ........... 709/108 |
| 6,367,005 | B1 |   | 4/2002 | Zahir et al. ................... 712/228 |
| 6,408,325 | B1 | * | 6/2002 | Shaylor ........................ 718/108 |
| 2001/0010075 | A1 | * | 7/2001 | Tremblay et al. ............ 712/228 |
| 2004/0003208 | A1 | * | 1/2004 | Damron ...................... 712/225 |

FOREIGN PATENT DOCUMENTS

WO    WO 02/13005    2/2002

* cited by examiner

*Primary Examiner*—Eddie P Chan
*Assistant Examiner*—Robert E Fennema
(74) *Attorney, Agent, or Firm*—Lisa K. Jorgenson; Thomas J. Satagaj; Seed IP Law Group PLLC

(57) ABSTRACT

The present invention relates to a method for managing the stack of a microprocessor comprising a central processing unit and a memory array, the central processing unit comprising registers containing contextual data and a stack pointer, the stack being a zone of the memory array used for saving contextual data upon a switch from a first to a second program. According to the present invention, the method comprises saving contextual data contained in a variable number of registers that varies according to the value of at least one flag stored in a register to be saved. Advantages: optimization of the filling of the stack and of the number of subprograms that can be interleaved.

16 Claims, 7 Drawing Sheets

METHOD FOR MANAGING A MICROPROCESSOR STACK FOR SAVING CONTEXTUAL DATA

BACKGROUND OF THE INVENTION

1. Field of the Invention

The present invention relates to microprocessors, and more particularly to a method for managing the stack of a microprocessor for saving contextual data upon a switch from a first to a second program. The present invention aims in particular to produce a microprocessor with extended memory array that is compatible with a microprocessor with reduced memory array.

2. Description of the Related Art

FIG. 1 very schematically represents a prior art first generation 8-bit microprocessor MP1 marketed by the applicant. The microprocessor comprises a central processing unit or CPU and a memory array MEM1 addressable through a 16-bit address bus ADBUS and accessible through an 8-bit data bus DBUS. The memory array thus has a maximum size of 64 Kbytes ($2^{16}$ bytes) and comprises various memory zones among which particularly a volatile memory zone DMEM, for saving application data, a volatile memory zone forming a stack STK, as well as a non-volatile program memory zone PRGMEM for saving one or more application programs can be distinguished. The volatile memory zones are for example of RAM type and the non-volatile memory zones of ROM, EPROM, EEPROM or Flash type.

The CPU comprises various registers of 8 bits in which contextual data CTX are stored. A condition code register CCR, an accumulator ACC, an index register X, and registers PCL, PCH respectively receiving the least significant byte and the most significant byte of a program counter PC can be distinguished. During the execution of a program, the program counter PC designates the address of the next instruction to be executed and is incremented after reading the previous instruction. The index register X contains data required to execute instructions with indexed addressing or operations provided by an application program. The accumulator ACC contains the result of calculations or operations performed by the arithmetic and logic unit of the CPU (not represented).

As represented in FIG. 1A, the register CCR contains flags indicating results of operations or of instructions, typically the flags C (Carry), Z (Zero), N (Negative), H (Half Carry), I0 and I1 (interrupt masks) and here contains two unused locations (two bits).

When the CPU switches from a program in course of execution to another program, generally an interrupt subprogram, the CPU saves the contextual data CTX present in the registers CCR, ACC, X, PCH, PCL in the stack STK then reads the address of the first instruction of the subprogram at a location of the program memory PRGMEM designated by an interrupt vector, loads this new address into the program counter PC, the initial content of which has been saved in the stack, and executes the subprogram.

The contextual data CTX are saved byte by byte in the stack STK, from a bottom address ADL and up to a top address ADH that are invariable and fixed by the manufacturer. The save address of the contextual data is indicated by a stack pointer SP stored in registers SPL, SPH of the CPU, these registers respectively containing the least significant byte and the most significant byte of the stack pointer. After each save of a byte of contextual data, the stack pointer is incremented by one unit.

The size of the stack and the number of bytes of contextual data to be saved upon each switch from one program to another, determine the number of switches into interleaved programs that can be performed by the CPU, i.e., the number of latency interrupts that can be handled successively and cumulatively. If the contextual data comprise five bytes as indicated above, and if the stack extends for example over 25 lines of the memory array MEM1, the CPU can perform 25/5, i.e., 5 cascade switches without the stack overflowing. Therefore stacked contextual data CTX1, CTX2, CTX3, . . . CTXj as represented in FIG. 1 are found in the stack.

Upon each return to an initial program (that may be an interrupt subprogram in the case of interleaved subprograms) the contextual data stored in the stack STK are recovered by the CPU at the location indicated by the stack pointer SP, the state of the registers CCR, ACC, X, PCH, PCL is restored and the CPU resumes the execution of the initial program at the place at which it had been interrupted. Upon each restoration of a byte of contextual data, the stack pointer is decremented by one unit, according to the LIFO ("Last In First Out") pushing/popping principle in which the last datum entered is the first datum read.

FIG. 2 schematically represents a new generation 8-bit microprocessor MP2, intended by the applicant. The microprocessor MP2 differs from the microprocessor MP1 by the fact that it comprises an extended memory array MEM2 addressable under 24 bits instead of 16 bits, via the address bus ADBUS. Therefore, the memory array MEM2 here comprises 256 sectors SCT0, SCT1, . . . SCT255 of 64 KB each, and the first sector SCT0 corresponds to the memory array MEM1 of the microprocessor MP1.

This extension of the memory array requires providing an additional register PCE ("Program Counter Extended Address") in the CPU, for obtaining a program counter PC of 24 bits instead of 16, adapted to the size of the extended memory array.

Upon each switch from a first to a second program, the CPU must therefore save the content of the six registers CCR, ACC, X, PCE, PCH, PCL in the stack STK, i.e., six bytes of contextual data CTX instead of five.

It is desirable for the microprocessor MP2 to be compatible with the microprocessor MP1, that is that it can receive and execute application programs developed for the microprocessor MP1. The space allocated to the stack STK must therefore remain constant and remain delimited by the addresses ADL, ADH in the sector SCT0. If this is not the case, if a change in the size and/or in the location of the stack of the microprocessor were provided, this change could lead to an encroachment of the program data and of the application data of the program designed for the microprocessor MP1, on the location of the stack of the microprocessor MP2.

However, the following problem arises: as the size of the stack STK is kept constant, providing the extended addressing register PCE limits the number of programs that can be interleaved since one additional byte of contextual data must be saved. By referring again to the example of a stack comprising 25 save locations, the number of programs that can be interleaved is now 25/6, i.e., 4 instead of 5 (one line of the stack STK remaining unused).

This constitutes an obstacle to the desired compatibility, as a program developed for the former generation of microprocessors could use the resources of the stack to the maximum. The execution of this program will result in the occurrence of a failure since the CPU will not be able to increment the stack pointer above the address ADH, such that contextual data will be lost.

BRIEF SUMMARY OF THE INVENTION

One object of the present invention is to preserve the compatibility between two generations of microprocessors that differ by an extension of the memory array and an extension of the size of the program counter.

One more general object of the present invention is to provide a method for saving contextual data allowing the management of the space allocated to the stack to be optimized so as to maintain a high degree of program interleaving.

These objects are achieved by providing a microprocessor comprising a central processing unit and a memory array, the central processing unit comprising registers containing contextual data and a stack pointer, the memory array comprising a stack for saving contextual data, the central processing unit being arranged for saving contextual data upon a switch from a first to a second program, with the special feature that the central processing unit is arranged for saving contextual data contained in a variable number of registers that varies according to the value of at least one flag stored in a register to be saved.

According to one embodiment, the central processing unit is arranged for changing the value of the flag according to the content of a register, before saving contextual data contained in a variable number of registers that varies according to the value of the flag.

According to one embodiment, the central processing unit is arranged for changing the value of the flag according to the content of an extended addressing register of a program counter of the central processing unit.

According to one embodiment, the central processing unit is arranged for, when the content of the extended addressing register is equal to 0, saving all the registers of the central processing unit containing contextual data, except for the extended addressing register, or, when the content of the extended addressing register is not equal to 0, saving all the registers of the central processing unit containing contextual data, including the extended addressing register.

According to one embodiment, the central processing unit is arranged for performing a test on the value of the flag so as to determine the number of registers to be saved.

According to one embodiment, the central processing unit is arranged for, upon the return to the first program, restoring the register containing the flag and restoring contextual data contained in a variable number of registers that varies according to the value of the flag present in the restored register.

According to one embodiment, the central processing unit is arranged for saving the register containing the flag last.

According to one embodiment, the flag comprises at least one bit of a register containing condition code flags.

The present invention also relates to a method for managing the stack of a microprocessor comprising a central processing unit and a memory array, the central processing unit comprising registers containing contextual data and a stack pointer, the stack being a zone of the memory array dedicated to saving contextual data upon a switch from a first to a second program, the method comprising saving contextual data contained in a variable number of registers that varies according to the value of at least one flag stored in a register to be saved.

According to one embodiment, the method comprises a step of changing the value of the flag according to the content of a register, before saving contextual data contained in a variable number of registers that varies according to the value of the flag.

According to one embodiment, the value of the flag is changed according to the content of an extended addressing register of a program counter of the central processing unit.

According to one embodiment, the method comprises steps of, when the content of the extended addressing register is equal to 0, saving all the registers of the central processing unit containing contextual data, except for the extended addressing register, or, when the content of the extended addressing register is not equal to 0, saving all the registers of the central processing unit containing contextual data, including the extended addressing register.

According to one embodiment, the method comprises a step of testing the value of the flag for determining the number of registers containing the data to be saved.

According to one embodiment, the method comprises steps of restoring the register containing the flag, then restoring contextual data contained in a variable number of registers that varies according to the value of the flag present in the restored register.

According to one embodiment, the register containing the flag is saved last and is restored first.

According to one embodiment, the flag is formed by at least one bit of a register containing condition code flags.

BRIEF DESCRIPTION OF THE SEVERAL VIEWS OF THE DRAWING(S)

These and other objects, features and advantages of the present invention will be explained in greater detail in the following description of two embodiments of a microprocessor according to the present invention, given in relation with, but not limited to, the following figures:

FIG. 1 described above represents the architecture of a classical microprocessor in block form;

DETAILED DESCRIPTION OF THE INVENTION

Figure 2:
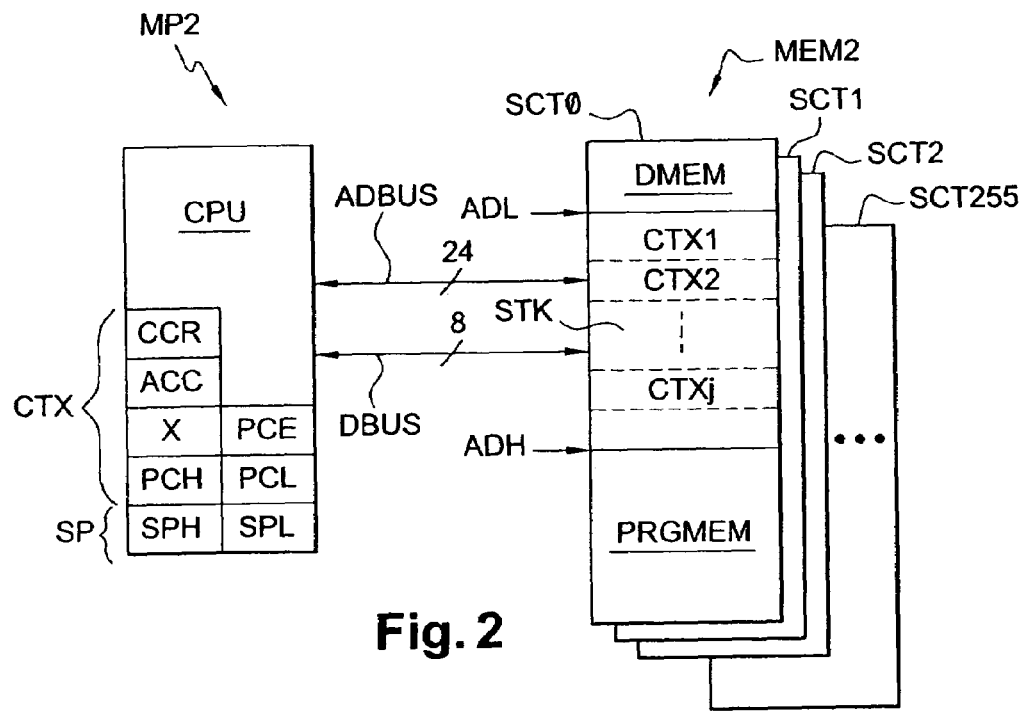
FIG. 2 represents in block form the architecture of a microprocessor according to the present invention, having an extended memory array.
Figure 2A:
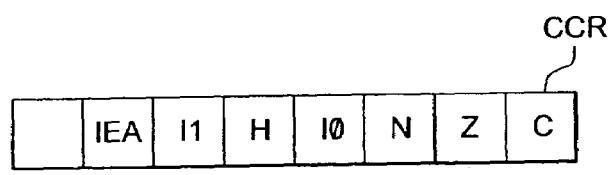
FIG. 2A represents the content of a register of the microprocessor in FIG. 2.

FIG. 2 described above schematically represents the architecture of a microprocessor with extended memory array MP2 in which a stack STK management method according to the present invention is implemented.

As indicated above, the program counter PC here comprises 24 bits stored in three bytes in registers PCE, PCH, PCL of the CPU. The extended memory array MEM2 comprises 256 sectors SCT0 to SCT255 of 64 Kbytes each.

Figure 1:
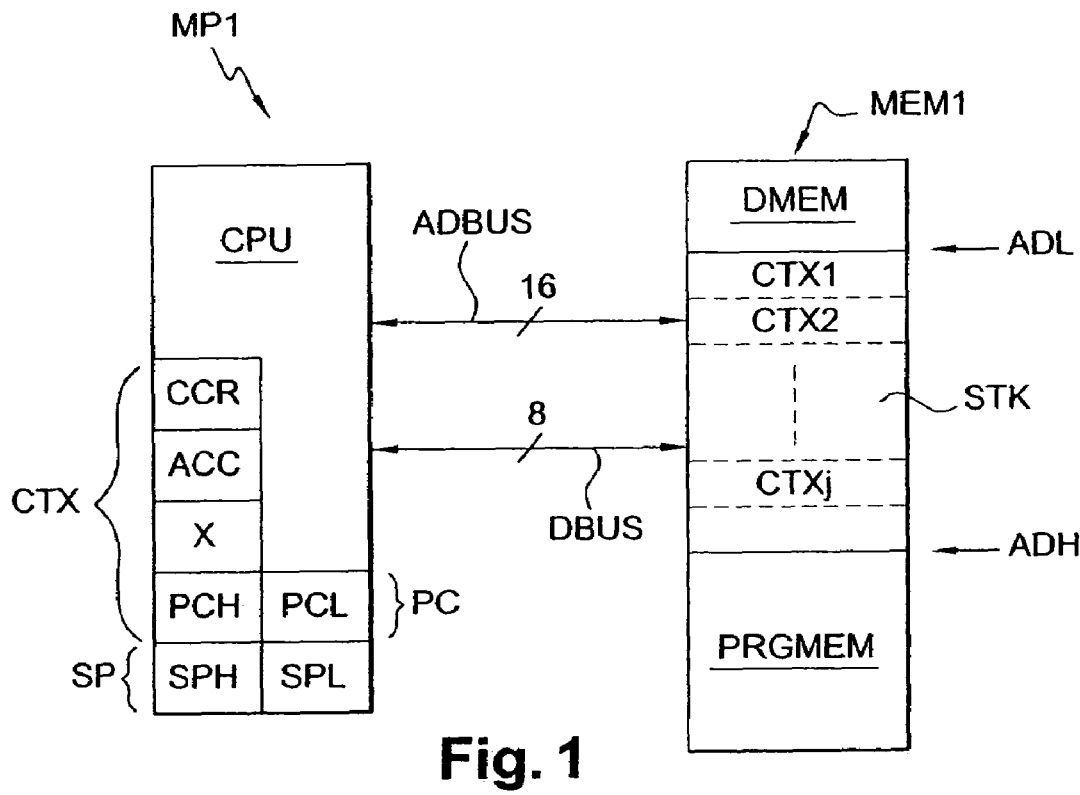
FIG. 1A represents the content of a register of the microprocessor in FIG. 1.
Figure 1A:
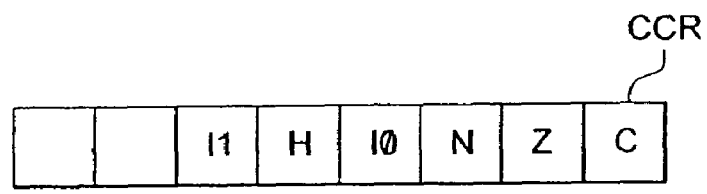

The CPU is arranged for executing, in addition to a set of new generation instructions allowing the entire extent of the memory array to be worked on, a set of simplified instructions allowing the first sector SCT0 to be worked on, said first sector keeping the same structure as the memory array MEM1 of the first generation microprocessor MP1 represented in FIG. 1, so that the two generations of microprocessors are compatible.

Upon executing these simplified instructions, the extended addressing register PCE of the program counter PC is reset to zero and is left on zero, since the instructions of the former generation programs are logged in the first sector SCT0, the addresses of which are only coded on 16 bits and can be managed by means of the registers PCH, PCL. On the other hand, the new set of instructions is intended for programs logged in all the sectors SCT1 to SCT255 and uses the register PCE.

The CPU, that is classically a hard-wired logic state machine or a microprogrammed logic machine, is designed for saving the contextual data present in the registers CCR, ACC, X, PCH, PCL, PCE in accordance with a stack management method according to the present invention.

According to this method, the CPU does not save the content of the extended addressing register PCE when this is zero. Furthermore, information indicating that the extended addressing register PCE has or has not been saved is inserted into the contextual data so that the CPU knows, upon restoring the contextual data, the number of data to read in the stack STK. In the example of an embodiment described here as an example, the condition code register CCR of the first generation microprocessor MP1 contains two available locations. One of these locations is used in the microprocessor MP2 for storing a flag IEA the value 1 or 0 of which forms the above-mentioned information.

Figure 3:
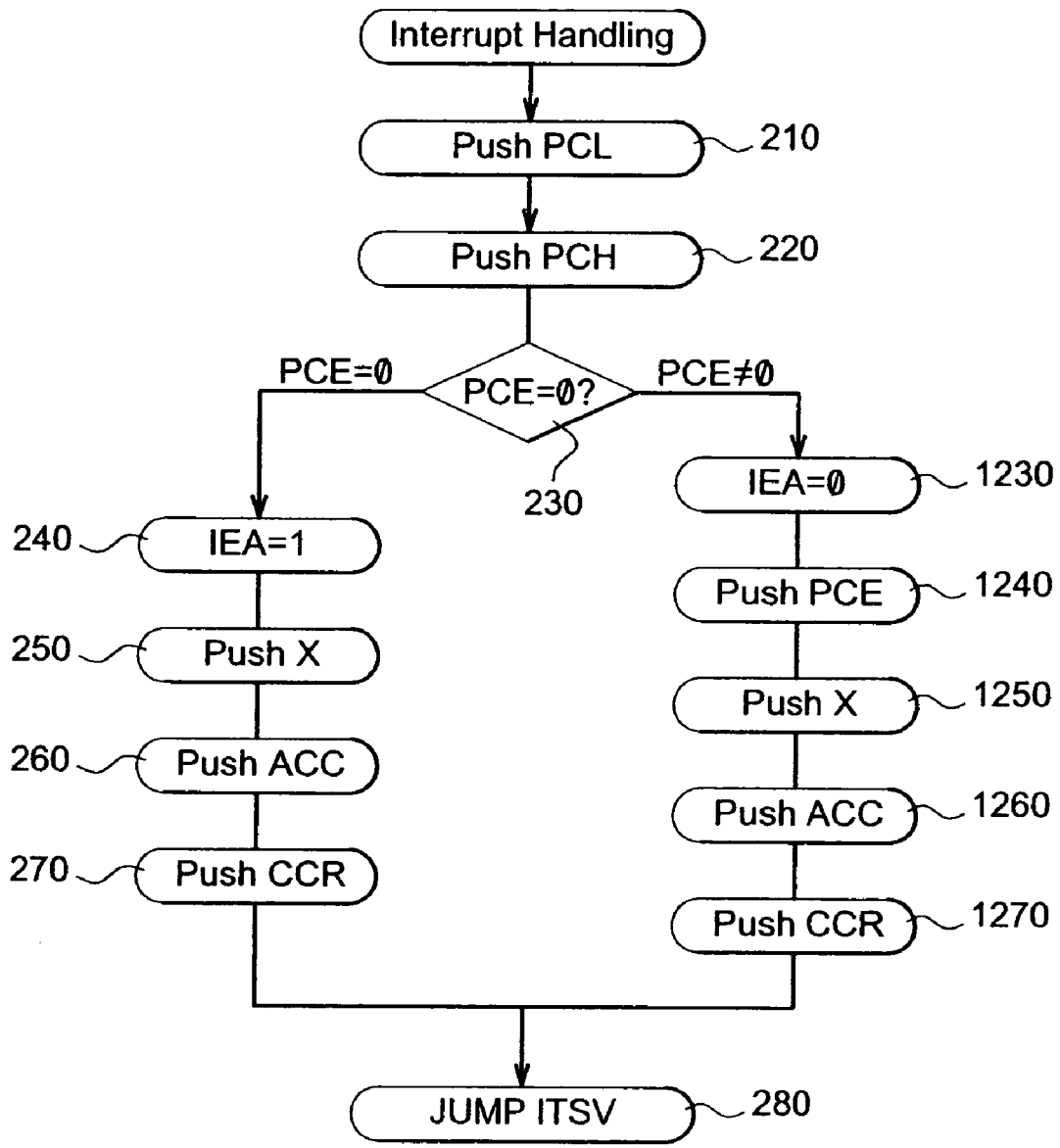
FIG. 3 is a flow chart representing steps of pushing data according to a stack management method according to the present invention.

FIG. 3 is a flow chart entitled "Interrupt Handling Sequence" describing operations of saving ("PUSH" instructions) contextual data in the stack STK, executed by the CPU.

First, the CPU saves the register PCL and the register PCH during two steps 210 and 220. In the next step 230, the CPU tests the content of the register PCE.

If the content of the register PCE is zero, the CPU sets the flag IEA to 1 in the condition code register CCR during a step 240. The CPU then executes steps 250, 260, 270 during which it successively saves the index X, accumulator ACC then code condition CCR registers (containing the flag IEA on 1), without saving the register PCE. The CPU then executes a step 280 "JUMP ITSV" ("Jump to Interrupt Service Routine") of jumping to an address for executing a subprogram for handling the interrupt, supplied by an interrupt vector.

If, on the contrary, the content of the register PCE is not zero, the CPU sets the flag IEA to 0 and executes steps 1240, 1250, 1260, 1270 during which it successively saves the registers PCE, X, ACC and CCR (containing the flag IEA on 0). The CPU then executes the step 280 "JUMP ITSV" of jumping to the interrupt subprogram.

Therefore, the number of contextual data saved in the stack is limited to the five registers PCL, PCH, X, ACC and CCR when the register PCE is zero.

Figure 4:
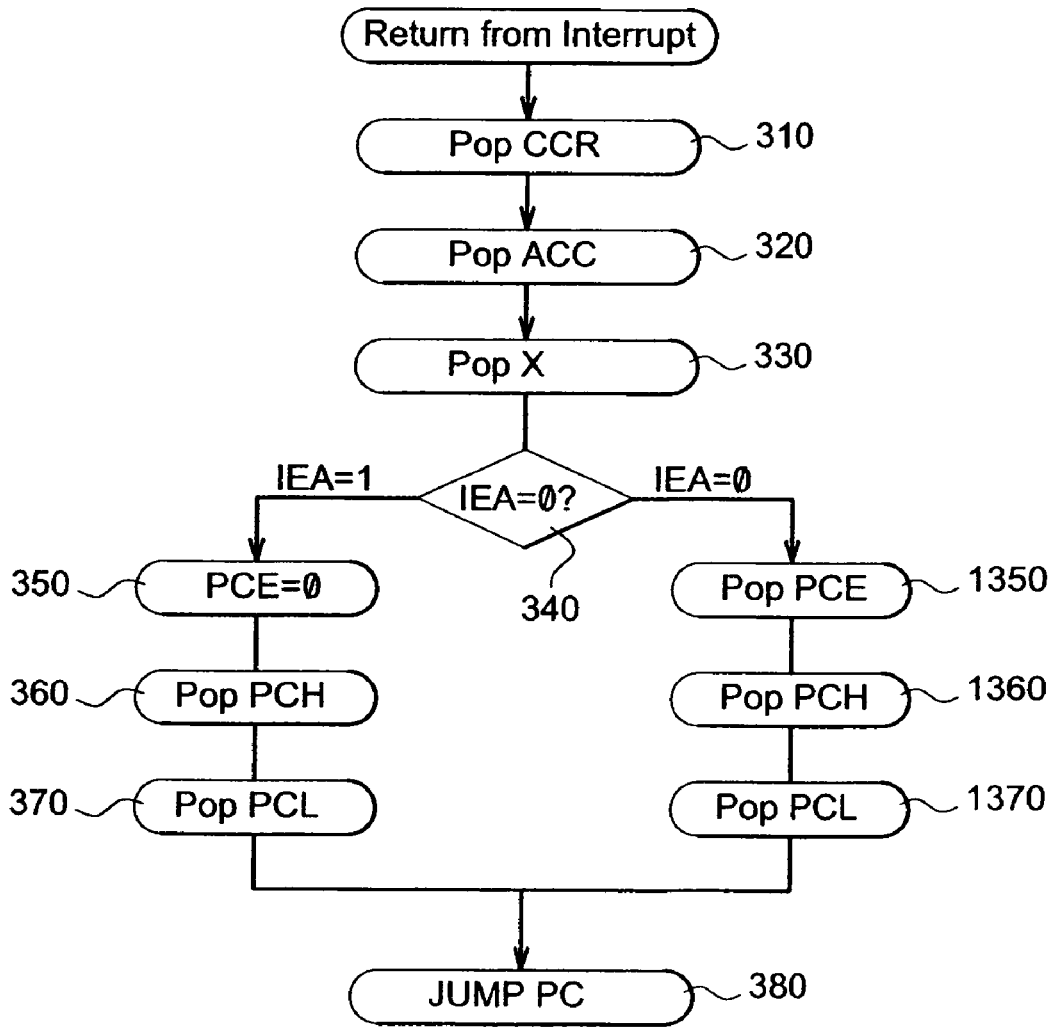
FIG. 4 is a flow chart representing steps of popping data according to the stack management method according to the present invention.

FIG. 4 is a flow chart entitled "Return from Interrupt" representing the operations of restoring the contextual data after executing the interrupt subprogram.

The CPU recovers the data ("POP" instruction) in the inverse order to which they were saved, according to the LIFO pushing/popping principle, by withdrawing the contextual data from the stack and restoring the registers starting with the last data logged in the stack.

During steps 310, 320 and 330, the CPU first restores the registers CCR, ACC and X, successively. In a next step 340, the CPU tests the value of the flag IEA in the register CCR, which has been restored in the step 310.

If the flag IEA is on 1, the CPU sets the extended addressing register PCE to zero during a step 350, then restores the registers PCH and PCL of the program counter PC during steps 360, 370. The CPU then executes a step 380 "JUMP PC" during which it jumps to the address contained in the program counter PC as restored, to resume the execution of the initial program.

If, on the contrary, the flag IEA is on 0, the CPU restores the three registers PCE, PCH and PCL of the program counter during steps 1350, 1360, 1370, then goes to the jump step 380.

The test step 340 can be an implicit step if the CPU is a hard-wired logic state machine. In this case, the branching of the step 330 to the steps 350 or 1350 varies according to the flag IEA used as a bit acting on the transitions from one state to another of the state machine.

Thus, all the registers of the central processing unit CCR, ACC, X, PCH, PCL, not forgetting the extended addressing register PCE and the stack pointer SPH, SPL, are entirely restored to their initial state.

The stack management method according to the present invention therefore ensures the compatibility of the microprocessor MP2 with the programs developed on the first generation of microprocessor MP1. With these programs, the content of the register PCE is always zero and the register PCE is never saved. The maximum number of interleaved subprograms is therefore kept and the risks of the stack overflowing are removed.

The register PCE is also not saved when its content is zero upon the execution of a program developed by means of the new set of instructions, which thus optimizes the filling of the stack, reduces the number of operations performed by the CPU to save and to restore the context, allows a few operation cycles to be gained and the handling of the interrupts to be accelerated.

Various applications of the present invention may be made, regardless of the problem of compatibility between microprocessors. Generally speaking, the fact that the register PCE is not saved when its content is zero allows the space available in the stack to be saved and the number of interleaved subprograms to be increased. This process of conditionally saving a register can further be extended to registers other than the register PCE.

Therefore, a generalization of the method that has just been described comprises saving a variable number of registers according to the value of a flag stored in one of the registers to be saved, as it will be understood in the light of the following description of a second example of an embodiment of the method according to the present invention.

Figure 5:
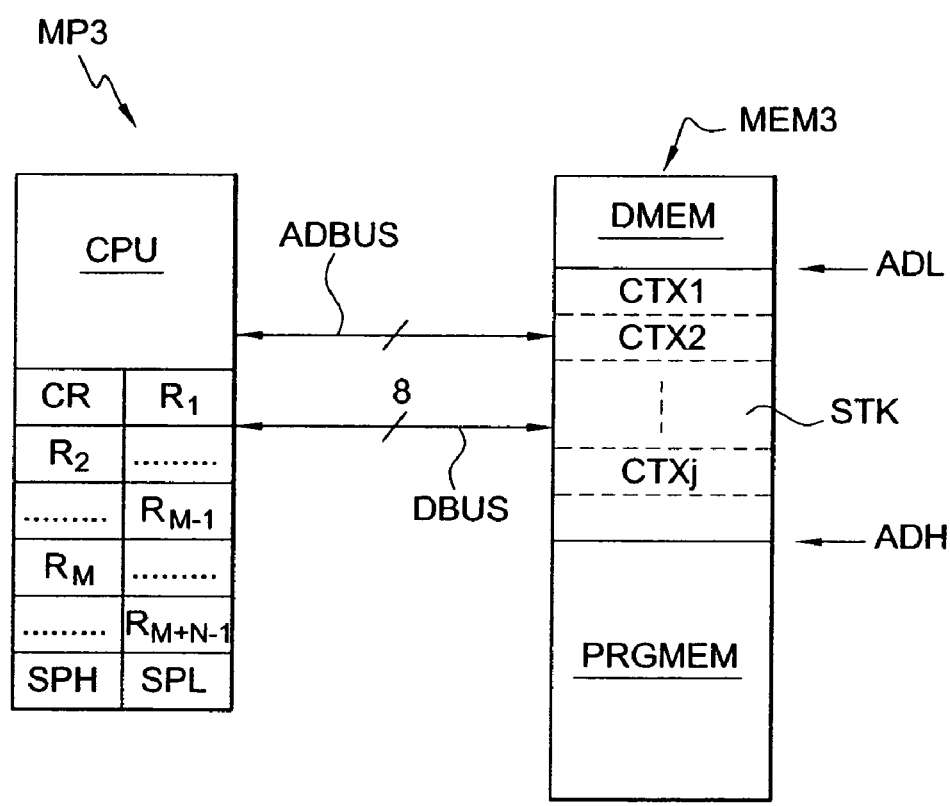
FIG. 5 represents the architecture of a microprocessor comprising any number of contextual data, and shows a generalization of the method of the present invention to this microprocessor.

FIG. 5 represents a microprocessor MP3 comprising, like the previous one, a central processing unit CPU and a memory array MEM3 in which a zone of fixed size forms the stack STK of the CPU. The CPU here comprises any number of registers CR, R1, R2, ... $R_{M-1}$, $R_M$, ... $R_{M+N-1}$, such as 8-bit registers for example, containing contextual data. The CPU also comprises registers SPH, SPL containing the two bytes of the stack pointer SP. Out of the registers of contextual data, the registers CR, R1 to $R_{M-1}$ contain contextual data of essential type and the registers $R_M$ to $R_{M+N-1}$ contain contextual data of non-essential type, susceptible of not being used by an application program. Furthermore, one particular register, here the register CR, is dedicated to storing a flag ISV that is read and write accessible to the user of the microprocessor, i.e., accessible to the application program developed by the user.

The value of the flag ISV is controlled by the application program to make the number of registers saved upon a switch into a subprogram vary.

Figure 6:
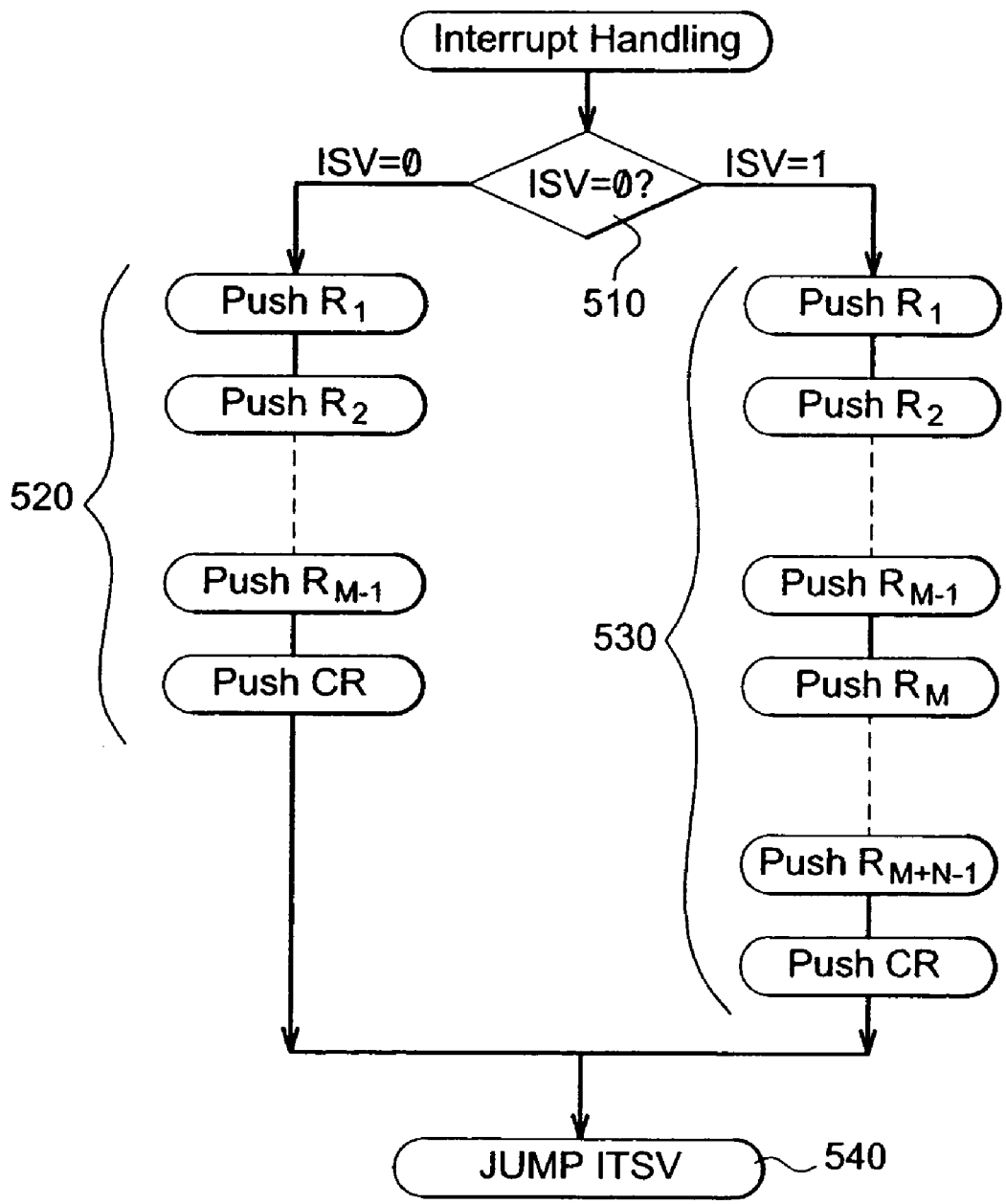
FIG. 6 is a flow chart representing steps of pushing data according to an alternative stack management method according to the present invention.

FIG. 6 is a flow chart entitled "Interrupt Handling" representing steps of saving contextual data executed by the CPU in response to an interrupt signal.

During a step 510, the CPU tests the state of the flag ISV contained in the register CR.

If the flag ISV is on 0, the CPU executes a series 520 of steps of saving the content of M registers in the stack STK, here the registers R1, R2, ... $R_{M-1}$, CR, the register CR being saved last. Therefore, M bytes of contextual data are saved and the stack pointer is incremented by M. The CPU then executes a step 540 "JUMP ITSV" ("Jump to Interrupt Service Routine") of jumping to an address supplied by an interrupt vector, to execute a subprogram for handling the interrupt.

If, on the contrary, the flag ISV is on 1, the CPU executes a series 530 of steps of saving all the M+N registers R1, R2, ... $R_{M-1}$, $R_M$, ... $R_{M+N-1}$, CR in the stack STK, the register CR being saved last. Therefore, M+N bytes of contextual data are saved and the stack pointer is incremented by M+N. The CPU goes to the jump step 540, to execute the interrupt subprogram.

Figure 7:
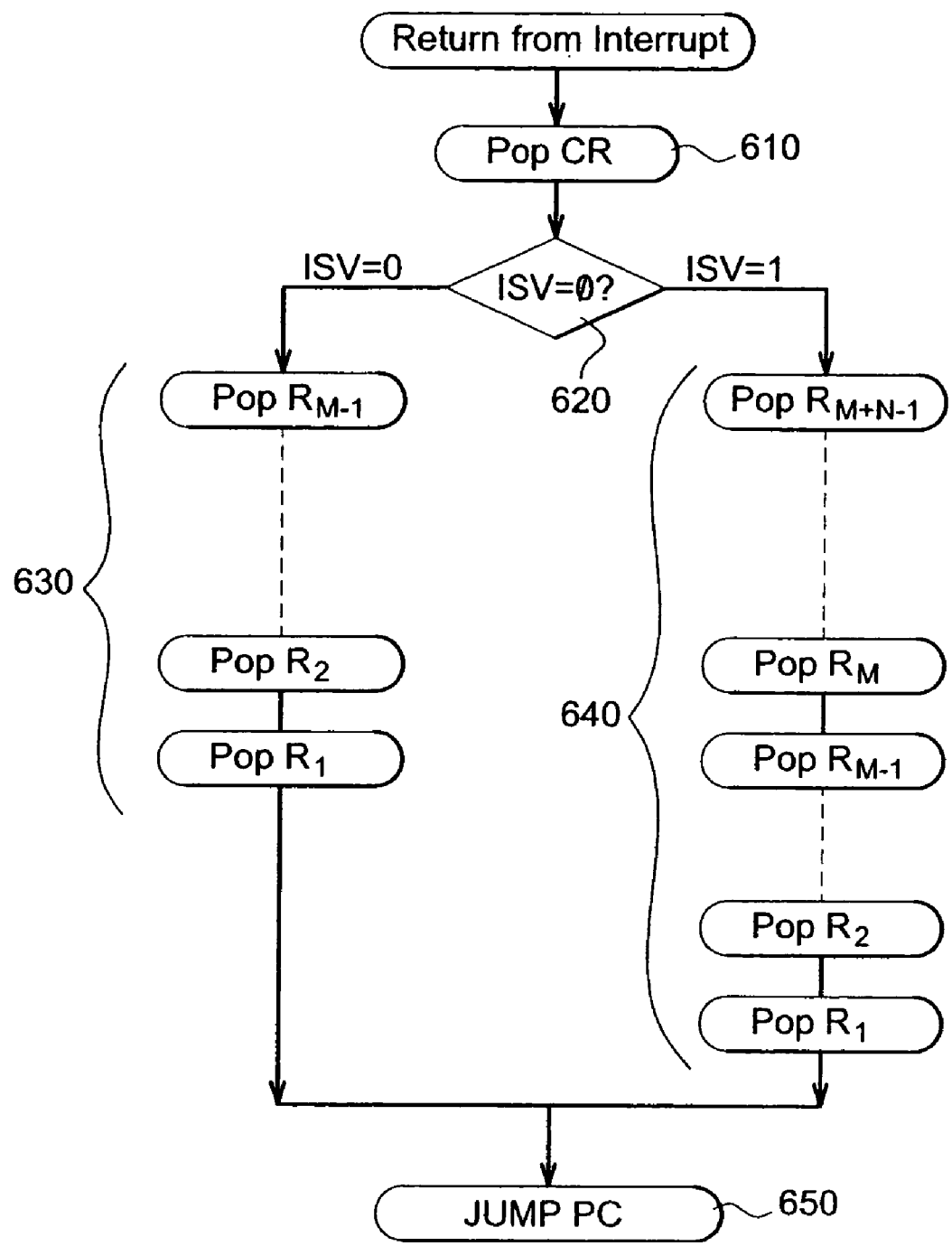
FIG. 7 is a flow chart representing steps of popping data according to the alternative stack management method according to the present invention.

FIG. 7 is a flow chart entitled "Return from Interrupt" showing the steps of restoring the registers of the CPU upon the return to the initial program.

As above, the last registers saved in the stack are the first to be restored.

Therefore, the CPU first restores the register CR during a step 610. The CPU then tests the flag ISV present in the restored register during a step 620.

If the flag ISV is on 0, the CPU executes a series 630 of steps of restoring the registers $R_{M-1}$, ... R2, R1, by unloading the following M−1 bytes from the stack. Then, during a step 650 "JUMP PC", the CPU jumps to the address contained in the program counter PC to resume the execution of the initial program.

If the flag ISV is on 1, the CPU executes a series 640 of steps of restoring the registers $R_{M+N+1}$, ... $R_M$, $R_{M-1}$, ... R2, R1, by unloading the following M+N−1 bytes from the stack, then goes to the jump step 650.

The test step 620 can also be implicit here if the CPU is a hard-wired logic state machine. The branching of the step 610 to the step 630 or to the step 640 is thus determined by the flag ISV as a bit acting on the state transitions of the state machine.

It will be understood by those skilled in the art that various other alternatives of the present invention may be made. In particular, the registers can be saved in a different order, in the following way for example:

if ISV=0, saving of the register CR, then saving of the registers R1 to $R_{M-1}$, or
if ISV=1, saving of the registers $R_M$ to $R_{M+N-1}$, then saving of the register CR, then saving of the registers R1 to $R_{M-1}$.

Then, at the time of the restoration:
restoration of the registers R1 to $R_{M-1}$,
restoration of the register CR,
if ISV=1, restoration of the registers $R_M$ to $R_{M+N-1}$.

The conditional saving and restoration according to the present invention can also relate to several groups of registers if an indicator with several flags is provided. For example, an indicator with two flags ISF1, ISF2 allows 4 different configurations of saving to be defined, and four different groups of registers to be saved to be defined, the registers containing essential contextual data being included in each of the groups of registers.

Various applications of the present invention may also be made. Thus, the term microprocessor is without limitation, as, generally speaking, the present invention applies to any type of integrated circuit comprising a central processing unit for executing programs, and comprising contextual data to be saved upon the switch from one program to another, such as microcontrollers, DSPs (digital signal processors), etc.

The implementation of the method of the present invention is therefore particularly advantageous in microcontrollers which, due to the various peripherals they comprise, must handle very long queues of interrupts, requiring a high degree of interleaving of the interrupt subprograms. The present invention therefore allows the management of the stack to be optimized so as to maximize the degree of interleaving.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A microprocessor comprising:
a memory array having a stack for saving contextual data; and
a central processing unit coupled to the memory array, the central processing unit having registers containing contextual data and a stack pointer and being arranged for saving contextual data upon a switch from a first to a second program in a variable number of registers that varies according to a value of at least one flag stored in a register to be saved,
wherein the central processing unit is arranged for changing the value of the at least one flag according to the content of an extended addressing register of a program counter of the central processing unit before saving contextual data contained in a variable number of registers that varies according to the value of the at least one flag, wherein the central processing unit is arranged for, when the content of the extended addressing register is equal to a first value, saving all the registers of the central processing unit containing contextual data, except for the extended addressing register.

2. The microprocessor according to claim 1 wherein the central processing unit is arranged for:
when the content of the extended addressing register is not equal to the first value, saving all the registers of the central processing unit containing contextual data, including the extended addressing register.

3. The microprocessor according to claim 1 wherein the central processing unit is arranged for performing a test on the value of the at least one flag so as to determine the number of registers to be saved.

4. The microprocessor according to claim 1 wherein the central processing unit is arranged for, upon the return to the first program:
restoring the register containing the at least one flag at a first time; and restoring contextual data contained in a variable number of registers that varies according to the value of the at least one flag present in the restored register at a second time subsequent to the first time.

5. The microprocessor according to claim 1 wherein the central processing unit is arranged for saving the register containing the at least one flag last.

6. The microprocessor according to claim 1 wherein the at least one flag comprises at least one bit of a register containing condition code flags.

7. A method for managing a stack of a microprocessor having a central processing unit and a memory array, the central processing unit having registers containing contextual data and a stack pointer, the stack being a zone of the memory array dedicated to saving contextual data upon a switch from a first to a second program, the method composing:

saving contextual data contained in a variable number of registers that varies according to the value of at least one flag stored in a register to be saved;

changing the value of the at least one flag according to the content of an extended addressing register of a program counter of the central processing unit before saving the contextual data; and when the content of the extended addressing register is equal to a first value, saving all the registers of the central processing unit containing contextual data, except for the extended addressing register.

8. The method according to claim 7, comprising the following steps:

when the content of the extended addressing register is not equal to the first value, saving all the registers of the central processing unit containing contextual data, including the extended addressing register.

9. The method according to claim 7, comprising a step of:

testing the value of the at least one flag for determining the number of registers containing the data to be saved.

10. The method according to claim 7, comprising the following steps:

restoring the register containing the at least one flag; then restoring contextual data contained in the variable number of registers that varies according to the value of the at least one flag present in the restored register.

11. The method according to one claim 7 wherein the register containing the at least one flag is saved last and is restored first.

12. The method according to claim 7 wherein the at least one flag is formed by at least one bit of a register containing condition code flags.

13. A microprocessor comprising:

a memory array having stored therein contextual data;

a central processing unit coupled to the memory array;

a plurality of registers associated with the central processing unit, a first group of the registers storing contextual data and a second group of the registers not storing contextual data when a flag has a first value and switching to store contextual data also in the second group of registers when the flag switches to a second value, such that the number of registers that store contextual data is variable, and where the flag is stored in a register to be saved as part of the program contextual data;

a stack pointer associated with the central processing unit and being arranged for directing contextual data to be stored in the first group only or in both the second group and the first group, based on the flag value; and wherein the central processing unit is arranged for, when the content of the flag is equal to the first value, saving all the registers of the central processing unit containing contextual data, except for an extended addressing register.

14. The microprocessor according to claim 13 wherein the second group of registers includes a register which is used as an extended addressing register when the flag is at a first value.

15. The microprocessor according to claim 13 wherein the second group of registers includes a single register.

16. The microprocessor of claim 13 wherein the flag is asserted to the second value when the extended portion of the program counter has a portion of an extended address.

* * * * *

UNITED STATES PATENT AND TRADEMARK OFFICE
CERTIFICATE OF CORRECTION

| | | |
|---|---|---|
| PATENT NO. | : 7,421,570 B2 | Page 1 of 1 |
| APPLICATION NO. | : 10/779855 | |
| DATED | : September 2, 2008 | |
| INVENTOR(S) | : Gosagan Padmanabhan et al. | |

It is certified that error appears in the above-identified patent and that said Letters Patent is hereby corrected as shown below:

Column 9
Line 16, "the method composing:" should read as --the method comprising:--

Signed and Sealed this

Eighth Day of December, 2009

David J. Kappos
*Director of the United States Patent and Trademark Office*